United States Patent [19]
Bhargava et al.

[11] Patent Number: 4,821,904
[45] Date of Patent: Apr. 18, 1989

[54] ELECTRICAL OUTLET BOX WITH IMPROVED CABLE ENTRY APERTURE KNOCKOUT PANEL

[75] Inventors: N. Norm Bhargava; Jayanta L. Barua, both of Fort Wayne, Ind.

[73] Assignee: Bhar, Inc., Fort Wayne, Ind.

[21] Appl. No.: 85,737

[22] Filed: Aug. 17, 1987

[51] Int. Cl.⁴ .............................................. H02G 2/00
[52] U.S. Cl. ................................... 220/3.2; 220/3.5; 220/266
[58] Field of Search ................... 220/3.2, 3.3, 3.4, 3.5, 220/266; 174/65 R

[56] References Cited

U.S. PATENT DOCUMENTS

| | | | |
|---|---|---|---|
| 2,898,688 | 8/1959 | Cottar | 220/3.4 X |
| 3,740,451 | 6/1973 | Schindler et al. | 220/3.2 X |
| 3,773,968 | 11/1973 | Copp | 220/266 X |
| 3,873,759 | 3/1975 | Schindler et al. | 220/3.2 X |
| 4,071,159 | 1/1978 | Robinson et al. | 220/3.2 |
| 4,194,644 | 3/1980 | Narvaez | 220/3.3 |
| 4,209,103 | 6/1980 | Glovier | 220/3.4 |
| 4,389,535 | 6/1983 | Slater | 220/3.2 X |
| 4,673,097 | 6/1987 | Schuldt | 220/3.2 X |

Primary Examiner—Steven M. Pollard
Attorney, Agent, or Firm—Jeffers, Hoffman & Niewyk

[57] ABSTRACT

A molded plastic electrical outlet box having improvements relating to a plurality of webs for attaching a cable entry aperture knockout panel to the box wall structure defining a given aperture, a strip of flashing connected about the knockout panel, and a pattern of protrusions defined on the exterior face of each knockout panel. The attachment webs are located in a four point, balanced arrangement adjacent to the respective corners of the generally rectangular panel. Thus, any knockout force applied to the panel by the tip of an instrument, such as a screwdriver, will always be directed between the locations where the panel is anchored to the wall structure and tend to result in detachment of the panel. The protrusions can take any one of a variety of patterns, such as a knurled pattern or a multiplicity of cylindrical-, pyramidal- or tetrahedral-shaped projections, to define non-skid surfaces which prevent the tip of the instrument delivering the knockout force from slipping upon impact with the panel. The thin strip of flashing reduces the width of the gap between the knockout panel and the wall structure so as to substantially reduce the probability of a flame traveling between the panel and the wall structure to the box exterior. The flashing strip is so thin that it does not appreciably strengthen the attachment of the panel to the wall structure.

17 Claims, 3 Drawing Sheets

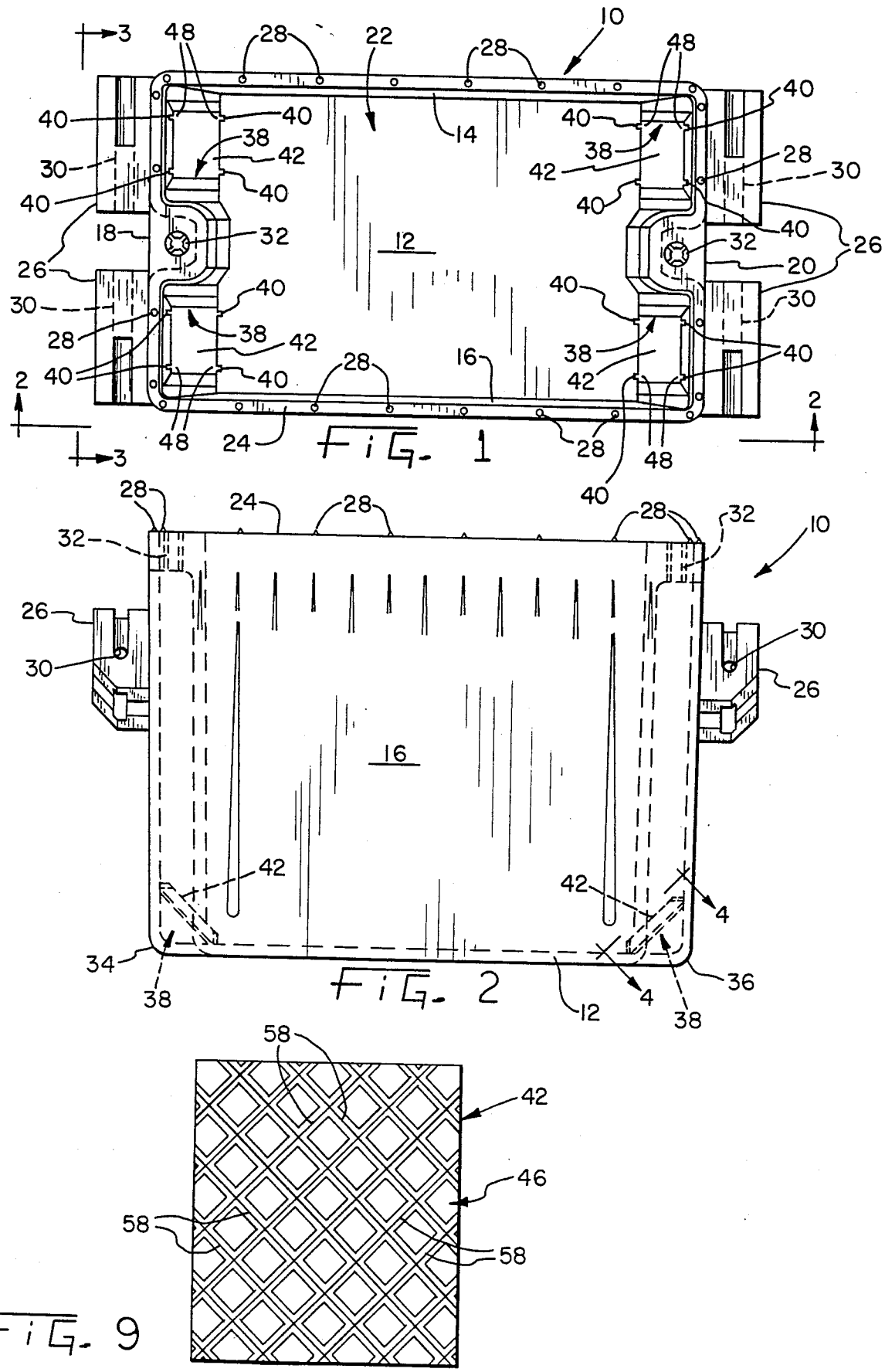

ELECTRICAL OUTLET BOX WITH IMPROVED CABLE ENTRY APERTURE KNOCKOUT PANEL

BACKGROUND OF THE INVENTION

1. Field of the Invention

The present invention generally relates to an electrical outlet box and, more particularly, is concerned with an improved knockout panel construction and attachment arrangement for closing a cable entry aperture defined in the box while facilitating easy detachment of the knockout panel when desired.

2. Description of the Prior Art

Various types of electrical outlet boxes, adapted to have electrical cables extended into the box for connection to terminals located therein, are well known in the art. These boxes are mounted in walls and ceilings during the construction of buildings, and afterwards during renovation thereof, to provide ready access to electrical service.

Representative of the prior art are the electrical outlet boxes disclosed in U.S. Pat. Nos. 2,788,151 (Shore), 2,898,688 (Cottar), 3,895,732 (Robinson et al), 4,202,457 (Tansi), 4,277,641 (Bauer et al), 4,304,958 (Neff et al), 4,306,109 (Nattel), 4,348,547 (Bowden), 4,436,952 (Lockwood), 4,304,957; 4,366,343; 4,389,535; 4,414,427 and 4,424,406 (Slater et al); in British patent No. 1,396,790 (Gore); in Canadian patents Nos. 577,589 (Elder) and 658,727 (Rudolph et al); and in a German patent No. DE 30 25 866 A1 (Grossauer).

All outlet boxes employ cable entry apertures generally in their rear portions which are adapted to permit access of the electrical power cables into the interior of the boxes. One or more electrical power cables are inserted into the box, each through a separate entry aperture, for connection of the conductor wires of the cable to an electrical fixture, such as a switch or receptacle, to be mounted to the front portion of the box.

In one type of molded plastic outlet box, as represented by those in the patents to Robinson et al and Slater et al, it is a common practice to substantially completely close the cable entry apertures with "knockout" panels. This is done in order to prevent debris from entering the box through any of the apertures that are not utilized, and to minimize the spread of fire from the interior of the box in the event of an electrical malfunction in the fixture or connection in the box. These panels are ordinarily removably attached to the box wall structure defining each aperture by connective material which bridges between and interconnects the panels and the wall structure.

To remove a knockout panel, the pointed end of a tool such as a screwdriver is used to rupture the connecting material, usually before the outlet box is mounted to the building wall stud. A standard practice is for the workman to hold the outlet box in one hand and strike the end of the screwdriver being gripped in the other hand against the knockout panel or pry under the panel with the end of the screwdriver.

In the case of many knockout panels, removal can be both hazardous and frustrating. In some instances, if proper care is not exercised, the end of the screwdriver is apt to glance off the panel surface and strike the workman's other hand holding the outlet box. In other instances, the panel can twist on the connective material instead of breaking cleanly, thereby taking more time than it should to complete its removal. The collective effect of these seemingly minor difficulties is to reduce worker productivity and increase construction costs. Consequently, a need still exists for improvements in the design and construction of electrical outlet boxes to overcome these shortcomings.

SUMMARY OF THE INVENTION

The present invention provides an improved electrical outlet box designed to satisfy the aforementioned needs. The present invention encompasses several different improvements which substantially overcome the shortcomings found in the prior art outlet boxes. The improvements are most advantageously incorporated together in the same outlet box, although the advantages to be derived from the improvements can be enjoyed separately from one another in different outlet boxes.

One improvement of the present invention relates to the provision of a balanced arrangement of the attachment webs which join or connect each knockout panel to the adjacent wall structure of the box. The attachment webs are advantageously located adjacent to the respective corners of the generally rectangular panel so as to provide a four-point balanced support of the knockout panel within the aperture and from the wall structure defining the aperture. Thus, any knockout force applied to the panel by the tip of an instrument, such as a screwdriver, will always be applied between the locations where the panel is anchored to the wall structure. Consequently, there will be little or no tendency for the panel to pivot about the connections and fail to sever. Instead, the panel is more likely to detach completely upon impact. If not, at least two adjacent webs will break together, leaving two other adjacent ones to be fractured merely by gripping and twisting the panel. In any event, it is highly unlikely that only two diagonally aligned webs would be broken, allowing the panel to pivot about the two other diagonally arranged webs. Thus, on the one hand, the four connecting webs provide a strong anchor for the panel in those instances where knockout is not desired, while, on the other hand, they tend to locate the application of the knockout force between them for enhancing easy detachment.

Another improvement of the present invention relates to the provision of a pattern of protrusions on the exterior face of each knockout panel. The protrusions can take any one of a variety of patterns, such as crisscrossing ridges or grooves, a knurled pattern, or a multiplicity of cylindrical-, pyramidal- or tetrahedral-shaped spaced projections. These patterns define non-skid surfaces which prevent the tip of the instrument delivering the knockout force from slipping upon impact with the panel. The impact force is thus directed onto the panel which makes it much easier to punch out the panel.

Yet another improvement of the present invention relates to the provision of a thin strip of flashing connected to the panel or wall and extending between the panel and the adjacent wall structure encompassing the panel and defining the aperture closed by the panel. The purpose of the flashing is to reduce the width of the gap between the knockout panel and the wall structure so as to substantially reduce the probability of a flame produced by an electrical mishap within the box from traveling between the panel and the wall structure to the exterior of the box. The flashing strip is so thin that it does not appreciably strengthen the attachment of the panel to the wall structure by the attachment webs. The flashing strip attached to the panel can either extend over and contact the wall structure or terminate short of it so as to leave a narrow or slight gap therebetween.

These and other advantages and attainments of the present invention will become more apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a elevational view of an electrical outlet box incorporating the improvements of the present invention, as seen from the open side of the box;

FIG. 2 is a side elevational view of the improved box as seen along line 2—2 of FIG. 1;

FIG. 9 is an enlarged view of one embodiment of the protrusion pattern formed on the exterior face of the knockout panel wherein the protrusions are in the form of criss-crossing ridges or a knurled pattern;

DETAILED DESCRIPTION OF THE INVENTION

Figure 3:
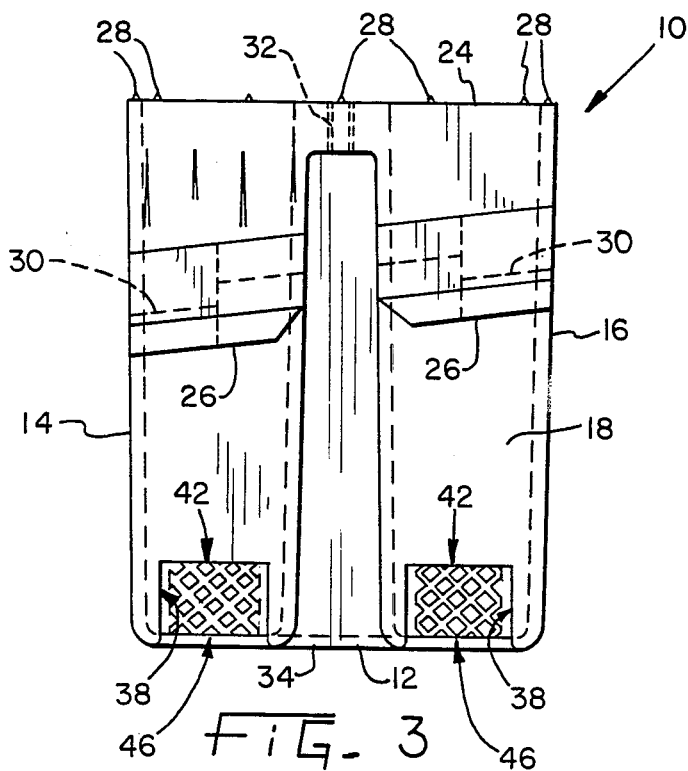
FIG. 3 is a another side elevational view of the improved box as seen along line 3—3 of FIG. 1.

Referring now to the drawings, and particularly to FIGS. 1 to 3, there is shown an electrical outlet box, generally designated by the numeral 10, which includes the improvements of the present invention in one form thereof. The outlet box 10 is preferably injection molded from a thermoplastic material, such as rigid PVC. The box 10 is generally rectangular, although it could be any other shape, such as circular. The box 10 is composed of a rear wall 12, a pair of opposite side walls 14, 16, and a pair of top and bottom walls 18, 20, all of which are interconnected so as to define the interior 22 of the box and an open front end bounded by a rim 24.

To mount the box 10 to a wall stud, a pair of aligned attachment brackets 26 are formed on each of the top and bottom walls 18, 20 of the box 10. Parenthetically, it should be understood that the identification of one wall as the top one and the other as the bottom one of the box 10 is strictly arbitrary and for purposes of convenience in describing the box. It would, of course, depend on the mounted orientation of the box. Also, a series of spaced apart, raised, generally conical-shaped protrusion 28 are formed along the rim 24. They are used to mark a pattern approximating the outline of the box 10 on a sheet of wall board (not shown) by placing the wall board in its intended position and pressing it against the box which has already been mounted to the wall stud by nails (not shown) driven through the holes 30 in the attachment brackets 26. The portion of the wall board within the pattern is then cut out to provide an opening for passage of the forward edge portion of the box 10 through the wall board when the wall board is applied to the wall studs. Further, threaded holes 32 are molded in the top and bottom walls 18, 20 which will receive screws (not shown) for mounting a fixture, such as a switch or receptacle (not shown), to the box 10. An outlet box cover (not shown) is ordinarily then attached to the fixture.

At upper and lower rear edges 34, 36, defined respectively by the rear wall 12 with the top and bottom walls 18, 20, a plurality of cable entry apertures 38 are defined in the box 10. Each of the apertures 38 is of sufficient size to receive a separate electrical power cable (not shown) therethrough. The ends of the conductors encased within the cable will ultimately be electrically connected to terminals associated with the fixture to be mounted on the box 10.

In accordance with one form of the present invention, the molded plastic electrical outlet box 10 incorporates improvements relating to a plurality of webs 40 for attaching each cable entry aperture knockout panel 42 to the box wall structure defining a given aperture 38, a strip of flashing 44 connected about the knockout panel 42, and a pattern of protrusions 46 defined on the exterior face of each knockout panel. The aforementioned improved components of the present invention are associated with each of the cable entry apertures 38 of the box 10.

Figure 4:
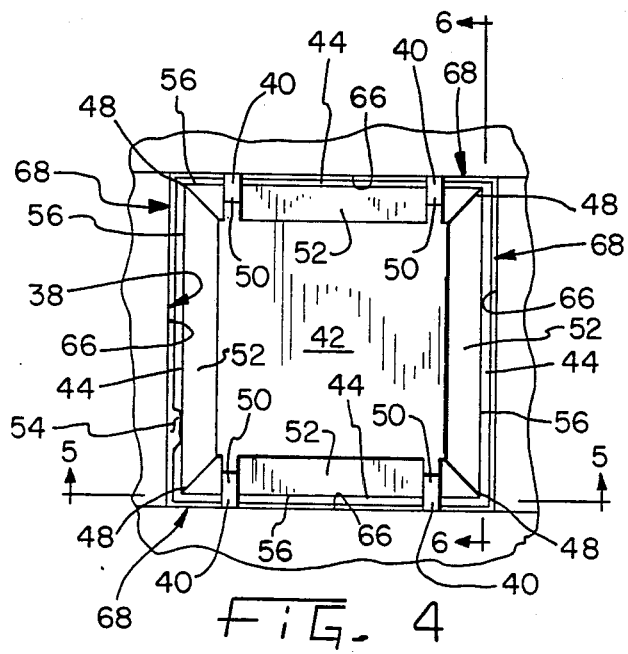
FIG. 4 is an enlarged fragmentary view of the improved box as seen along line 4—4 of FIG. 3, showing a plurality of webs attaching the knockout panel to the box wall structure and also showing the preferred form of a thin strip of flashing connected about the knockout panel and extending toward the adjacent wall structure defining the aperture but leaving a slight gap therebetween.
Figure 6:
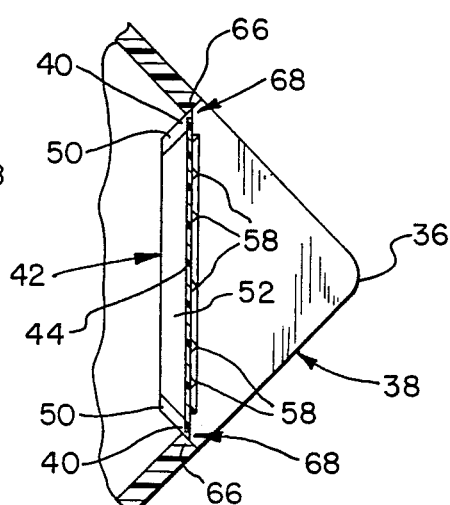
FIG. 6 is a side elevational view, partly in section, of the knockout panel, attachment webs and flashing as taken along line 6—6 of FIG. 4.
Figure 5:
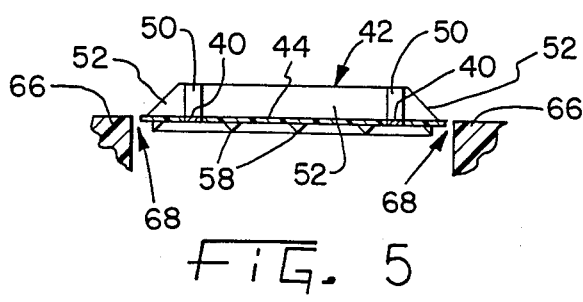
FIG. 5 is an end elevational view, partly in section, of the knockout panel, attachment webs and flashing as taken along line 5—5 of FIG. 4.

More particularly, as seen in FIGS. 1 and 4 to 6, the attaching webs 40 of the first improvement being associated with each knockout panel 42 are positioned in an advantageous arrangement. In particular, the short attachment webs 40 which join or connect each knockout panel 42 to the respective adjacent rear, top and bottom walls 12, 18, 20 of the box 10 defining the apertures 38 are preferably located adjacent to the respective corners 48 of the generally rectangular knockout panel 42 substantially equidistant from the center of panel 42. In such positions, the webs 40 provide a four-point balanced support of the knockout panel 42 within the aperture 38 and from the structure of the respective ones of the walls 12, 18, 20 defining the aperture. As seen in FIGS. 4 to 6, webs 40 are tip ends of raised tapered segments 50 integrally molded on an opposing pair of the four tapered sides 52 of the panel 42. The tip ends or webs 40 extend beyond the tapered sides 52 and define a narrow gap 54 within the range of 0.005 to 0.010 inch between the outer edges 56 of the panel sides 52 and the structure of the box walls defining the aperture 38.

In view of the four point balanced support arrangement, any knockout force applied to the panel 42 by the tip of an instrument, such as a screwdriver, will always be applied between the four-point locations where the panel 42 is anchored to the wall structure. Consequently, there will be little or no tendency for the panel 42 to pivot about the connections and fail to sever. Instead, the panel 42 is more likely to detach completely upon impact. Thus, on the one hand, the four connecting webs 40 provide a strong anchor for the panel 42 in those instances where knockout is not desired, while, on the other hand, they tend to direct and locate the application of a knockout force strategically between them for promoting easy detachment.

Figure 10:
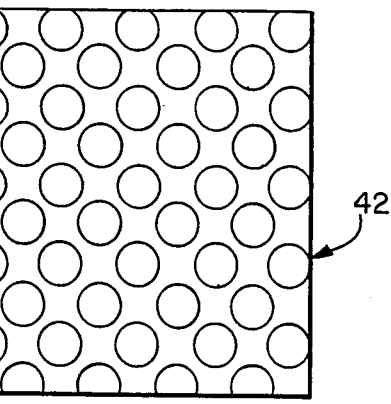
FIG. 10 is an enlarged view of an alternative embodiment of the protrusion pattern formed on the exterior face of the knockout panel wherein the individual protrusions are cylindrical-shaped.
Figure 11:
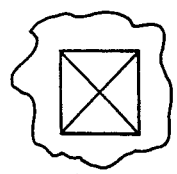
FIG. 11 is an enlarged view of another alternative embodiment of the configuration of an individual protrusion formed on the exterior face of the knockout panel wherein the protrusion is pyramidal-shaped.
Figure 12:
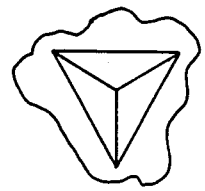
FIG. 12 is an enlarged view of yet another alternative embodiment of the configuration of an individual protrusion formed on the exterior face of the knockout panel wherein the protrusion is tetrahedral-shaped.

The pattern of protrusions 46, integrally formed on the exterior face of each knockout panel 42 and providing the second improvement, can take any one of a variety of patterns. By way of example, as seen in FIGS. 3 and 9, the protrusions 46 can be a pattern of criss-crossing ridges 58 or grooves (forming what is commonly referred to as a knurled pattern). In FIG. 10, alternatively, the pattern is composed of a multiplicity of spaced cylindrical-shaped projections 60, whereas in FIGS. 11 and 12 the individual projections 62, 64 are respectively pyramidal-shaped and tetrahedral-shaped.

It will be readily appreciated that all of these various patterns define non-skid surfaces which prevent the tip of the instrument delivering the knockout force from slipping upon impact with the panel 42. Instead, concurrently with striking the roughened surface, the tip will become lodged in the space between the individual ridges or projections of the respective patterns. In such manner, the impact force is directed at a point on the exterior face of the panel 42 within the confines of the attachment webs 40 which makes it much easier to punch out the panel.

In accordance with a further feature, a thin strip of flashing 44 as seen in FIGS. 4 and 5, is connected to the panel 42 and extends toward the adjacent structure of the ones of the respective walls 12, 18, 20 encompassing the panel 42 and defining the aperture 38 closed by the panel. Alternatively, the strip of flashing 44 could be connected to the walls 12, 18 and 20 of the box and extend toward panel 42. The purpose of the flashing 44 is to reduce the width of the gap 54 between the knockout panel 42 and the respective wall structure so as to substantially reduce the probability of a flame produced by an electrical mishap within the box 10 from traveling between the panel and the wall structure to the exterior of the box. The flashing strip 44 is so thin, for example 0.0015 inch that it does not appreciably strengthen the attachment of the panel 42 to the wall structure by the attachment webs 40.

Figure 7:
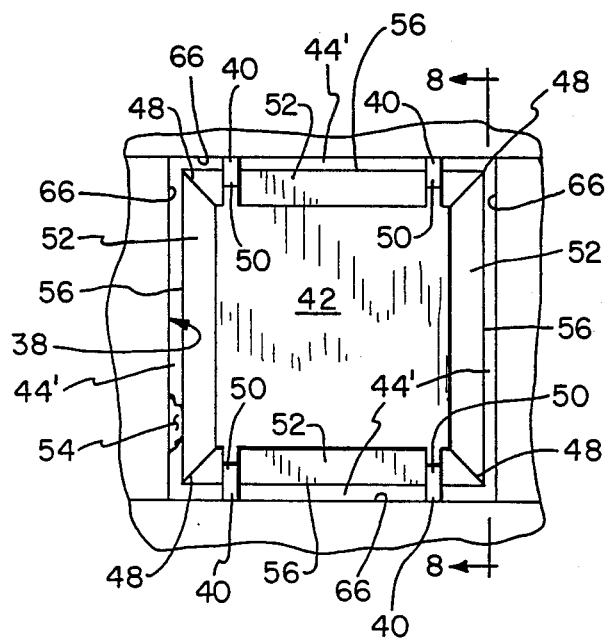
FIG. 7 is an enlarged fragmentary view of the improved box similar to that of FIG. 4, but showing an alternative form wherein the thin strip of flashing is connected about the knockout panel and extending toward and is connected with the adjacent wall structure defining the aperture.
Figure 8:
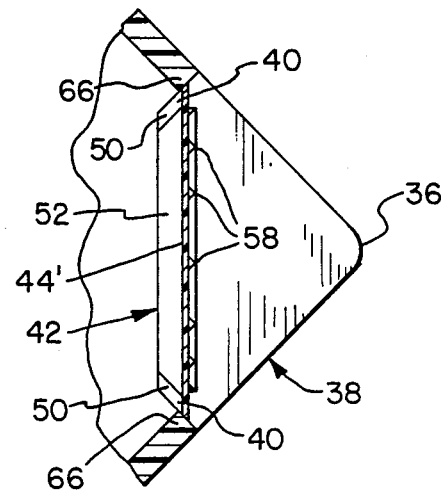
FIG. 8 is a side elevational view, partly in section, of the knockout panel, attachment webs and flashing as taken along line 8—8 of FIG. 7.

As seen in FIGS. 4 and 6, preferably the flashing strip 44 attached to the panel 42 terminates short of the edge 66 of the wall structure so as to leave a substantially narrower or slight gap 68 therebetween too small to permit flame to travel through it. Or, alternatively, as seen in FIGS. 7 and 8, the flashing strip 44' can extend over and contact the wall structure, effectively closing the gap 54.

The electrical outlet box of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. An electrical outlet box having wall means defining the interior of said box and at last one cable entry aperture defined in said box by a portion of said wall means for facilitating insertion of an electrical cable from the exterior of said box into said interior of said box, and comprising:

a knockout panel having a periphery; and rupturable means interconnecting said panel at more than two locations spaced about its periphery to said wall means portion so as to dispose said panel in a closed relation across said aperture and to support said panel in a substantially balanced relation from said wall means portion such that a knockout force applied to said panel will be directed within a region of said panel bounded by said interconnecting means so as to effectuate detachment of said panel from said walls means portion; and a multiplicity of protrusions on a side of said panel facing toward the exterior of said box, said protrusions defining a non-skid surface on said panel side which substantially prevents a knockout force delivering end of an instrument from slipping upon impact with said side of said panel.

2. The electrical outlet box as recited in claim 1, wherein said interconnecting means comprises a plurality of attachment webs being greater than two in number and extending between said periphery of said panel and said wall means portion at said spaced locations.

3. The electrical outlet box as recited in claim 1, wherein said interconnecting means joins said panel to said wall means portion at four locations generally equidistantly-spaced from the center of said panel.

4. The electrical outlet box as recited in claim 1, wherein:

said panel is generally of rectangular shape and has four corners; and said interconnecting means is at least four attachment webs each being located adjacent to one of said corners of said panel.

5. The electrical outlet box as recited in claim 1, wherein said wall means of said box forms a rim defining an open side of said box, said rim having a plurality of raised elements spaced therealong for marking a pattern on a wall board representing an outline of the periphery of said box when said wall board is placed against said open side of said box.

6. The electrical outlet box as recited in claim 1, wherein said protrusions are formed in a pattern of criss-crossing ridges.

7. The electrical outlet box as recited in claim 1, wherein said protrusions are formed in a pattern of spaced cylindrical-shaped projections.

8. The electrical outlet box as recited in claim 1, wherein said protrusions are formed in a pattern of spaced pyramidal-shaped projections.

9. The electrical outlet box as recited in claim 1, wherein said protrusions are formed in a pattern of spaced tetrahedral-shaped projections.

10. The electrical outlet box as recited in claim 1, wherein:
said interconnecting means disposes said panel at said periphery thereof in spaced relation from said wall means portion so as to define a gap therebetween; and
including a thin strip of flashing connected to said periphery of one of said panel and wall portion and extending toward said the other of said panel and wall portion so as to reduce the width of said gap between said panel and said wall means portion.

11. The electrical outlet box as recited in claim 10, wherein said strip of flashing makes contact with said panel and wall means portion.

12. The electrical outlet box as recited in claim 10, wherein said strip of flashing is connected to said panel and terminates short of said wall means portion so as to leave a gap therebetween substantially narrower than said gap defined between said panel and said wall means portion.

13. In an electrical outlet box having wall means defining the interior of said box and at least one cable entry aperture defined in said box by a portion of said wall means for facilitating insertion of an electrical cable from the exterior of said box into said interior of said box, the combination comprising:
a knockout panel;
rupturable attachment means extending between and interconnecting said panel and said wall means portion at locations spaced therealong so as to dispose said panel in a generally closed relation across said aperture with a side of said panel facing toward the exterior of said box; and
a multiplicity of protrusions formed on said side of said panel and defining a non-skid surface on said panel side which substantially prevents a knockout force delivering end of an instrument from slipping upon impact with said side of said panel.

14. The electrical outlet box as recited in claim 13, wherein said protrusions are formed in a pattern of criss-crossing ridges.

15. The electrical outlet box as recited in claim 13, wherein said protrusions are formed in a pattern of spaced cylindrical-shaped projections.

16. The electrical outlet box as recited in claim 13, wherein said protrusions are formed in a pattern of spaced pyramidal-shaped projections.

17. The electrical outlet box as recited in claim 13, wherein said protrusions are formed in a pattern of spaced tetrahedral-shaped projections.

* * * * *